(12) United States Patent
Higgins et al.

(10) Patent No.: US 6,868,777 B1
(45) Date of Patent: Mar. 22, 2005

(54) COOKER AND SMOKER APPARATUS AND METHOD OF SMOKE GENERATION, RECIRCULATION, AND EXHAUST

(76) Inventors: Mike Higgins, P.O. Box 522, Mesquite, TX (US) 75149; James K. Stewart, P.O. Box 522, Mesquite, TX (US) 75149

( * ) Notice: Subject to any disclaimer, the term of this patent is extended or adjusted under 35 U.S.C. 154(b) by 0 days.

(21) Appl. No.: 10/616,103

(22) Filed: Jul. 9, 2003

(51) Int. Cl.[7] ............................. A23B 4/03; A23B 4/044
(52) U.S. Cl. ............................. 99/482; 99/467; 426/314
(58) Field of Search .................. 99/482, 467; 126/283, 126/59.5; 110/108, 102, 118, 196; 426/509, 510, 511, 523, 312, 314, 315

(56) References Cited

U.S. PATENT DOCUMENTS

| | | | |
|---|---|---|---|
| 1,811,191 A | * | 6/1931 | Taylor ........................ 126/59.5 |
| 4,232,597 A | | 11/1980 | Perrine |
| 4,250,818 A | * | 2/1981 | Sigg ............................ 110/278 |
| 4,355,570 A | | 10/1982 | Martin et al. |
| 4,474,107 A | | 10/1984 | Cothran |
| 4,610,208 A | * | 9/1986 | Lersten et al. ............... 110/244 |
| 4,669,447 A | | 6/1987 | Kelly |
| 4,700,618 A | | 10/1987 | Cox |
| 5,078,049 A | | 1/1992 | Glanton |
| 5,355,782 A | * | 10/1994 | Blanchard ..................... 99/482 |
| 5,704,278 A | | 1/1998 | Cross |
| 6,142,066 A | | 11/2000 | Anders et al. |
| 6,167,797 B1 | | 1/2001 | Bollich |

* cited by examiner

*Primary Examiner*—Reginald L. Alexander
(74) *Attorney, Agent, or Firm*—Mark H. Miller; Jackson Walker L.L.P.

(57) ABSTRACT

A novel combination cooker and smoker and a novel method of efficiently cooking and smoking foodstuffs are disclosed. The combination cooker and smoker utilizes a novel forced air smoke recirculation path made efficient and compact with the use of single and double-acting dampers for airflow directional control. Efficiency over current cookers and smokers is also gained with a novel method of continuously delivering combustibles to a heat source using a vibrating fuel tray.

10 Claims, 5 Drawing Sheets

COOKER AND SMOKER APPARATUS AND METHOD OF SMOKE GENERATION, RECIRCULATION, AND EXHAUST

BACKGROUND OF THE INVENTION

1. Field of the Invention

Applicant's invention relates generally to the field of preparing foodstuffs for consumption. More specifically, Applicant's invention relates to the field of imparting wood-smoked flavors and aromas to meat during the process of warming or cooking.

2. Background Information

The general field of smoking foodstuffs and the specific field of barbecue are rich with disclosure and invention. The public domain is replete with barbecue techniques, mainly because the public has been charring meat for consumption since man discovered fire.

Perrine (U.S. Pat. No. 4,232,597) discloses a first airtight enclosure for smoking food. A second airtight enclosure, a smoke generator, is also disclosed. The second enclosure is separable and portable from the first enclosure, and the two communicate with each other through a common gasketed opening through which smoke generated in the second enclosure passes into the first enclosure for the purpose of imparting desired flavor and aroma to foodstuffs in the first enclosure without discharging smoke into the room in which the enclosures are situated. Perrine discloses the use of wood chips and dust and pellets and pills made of compacted wood dust as combustibles in the smoke generator. Electric or gas-fired heating elements or canned heat provide sufficient energy to burn the small combustibles with high efficiency. Perrine discloses the use of a timer to control burner cycles for efficient energy use. As a benefit of low temperature smoking, Perrine realizes decreased dehumidification of the cooking environment and decreased dehydration of the foodstuffs. Perrine's invention permits food such as cheese and nuts, and food that is pre-cooked, to be smoked without the application of high temperatures.

Cothran (U.S. Pat. No. 4,474,107) discloses a double oven that permits independent cooking and smoking, controlled with timers and thermostats, that is enhanced with electric heating elements and a unique natural convection flow design. Kelly (U.S. Pat. No. 4,669,447) discloses a combination smoker and convection cooker the smoke circulation of which is enhanced with forced convection created by an electric fan. Kelly also claims a rotating knife apparatus that automatically and periodically scrapes the charred face of a wood block that, when heated by electric means, is the smoke source.

Cox (U.S. Pat. No. 4,700,618) discloses a meat smoker having an internal smoke path damper and air inlet and outlet regulators that permit an operator to manually adjust the natural convection airflow that controls cooking temperature and smoke circulation. Glanton (U.S. Pat. No. 5,078,049) discloses a barbecue smoker having a damper for regulating the volume and path of air into the combustion chamber, and a sensor for monitoring conditions in the cooking chamber. Cross (U.S. Pat. No. 5,704,278) claims a high capacity rotary oven that operates at high efficiency due to a forced convection air circulation system. Anders (U.S. Pat. No. 6,142,066) discloses a combination smoker and convection oven. Bollich (U.S. Pat. No. 6,167,797) discloses a portable commercial forced air barbecue cooker that uses saw dust as the smoke-producing combustible.

SUMMARY OF THE INVENTION

Applicant enhances the field of food smokers with his novel combination cooker and smoker and his novel method of generating, recirculating, and exhausting smoke. Applicant achieves efficiency greater than that of existing food smokers with the use of forced convection and an air path utilizing multiple dampers, one or more of which is double-acting. Applicant's invention of a vibrating means that continuously feeds fuel such as wood disks into one or more heating elements permits unattended smoking. The efficiency of Applicant's invention decreases the amount of fuel required for smoke generation, fuel storage costs, the amount of time required for smoking, and labor costs.

The present invention provides a novel apparatus that will smoke and cook food.

The present invention further provides:

a. a control panel that allows the user to set cooking time and temperature, by controlling the controlling one or more of the ambient temperature of the cooking enclosure, the ambient temperature of the combustion chamber, the temperature of the foodstuffs, the heat source power, the vibrator power, the fan speed, the duration of the cooking or smoking process, the position of the first damper, the position of the second damper, the timer, the thermostat, and servo motors;

b. a recirculating duct system that uses less smoke than conventional smokers to continually immerse the food in smoke and also reducing the amount of fuel units needed; and c. a vibrating fuel unit holder upon which fuel units are placed, the vibrator feeds the fuel units to keep them in contact with the heat source, maximizing the amount of smoke produced from a minimum of fuel units.

DETAILED DESCRIPTION OF THE PREFERRED EMBODIMENT

Figure 1:
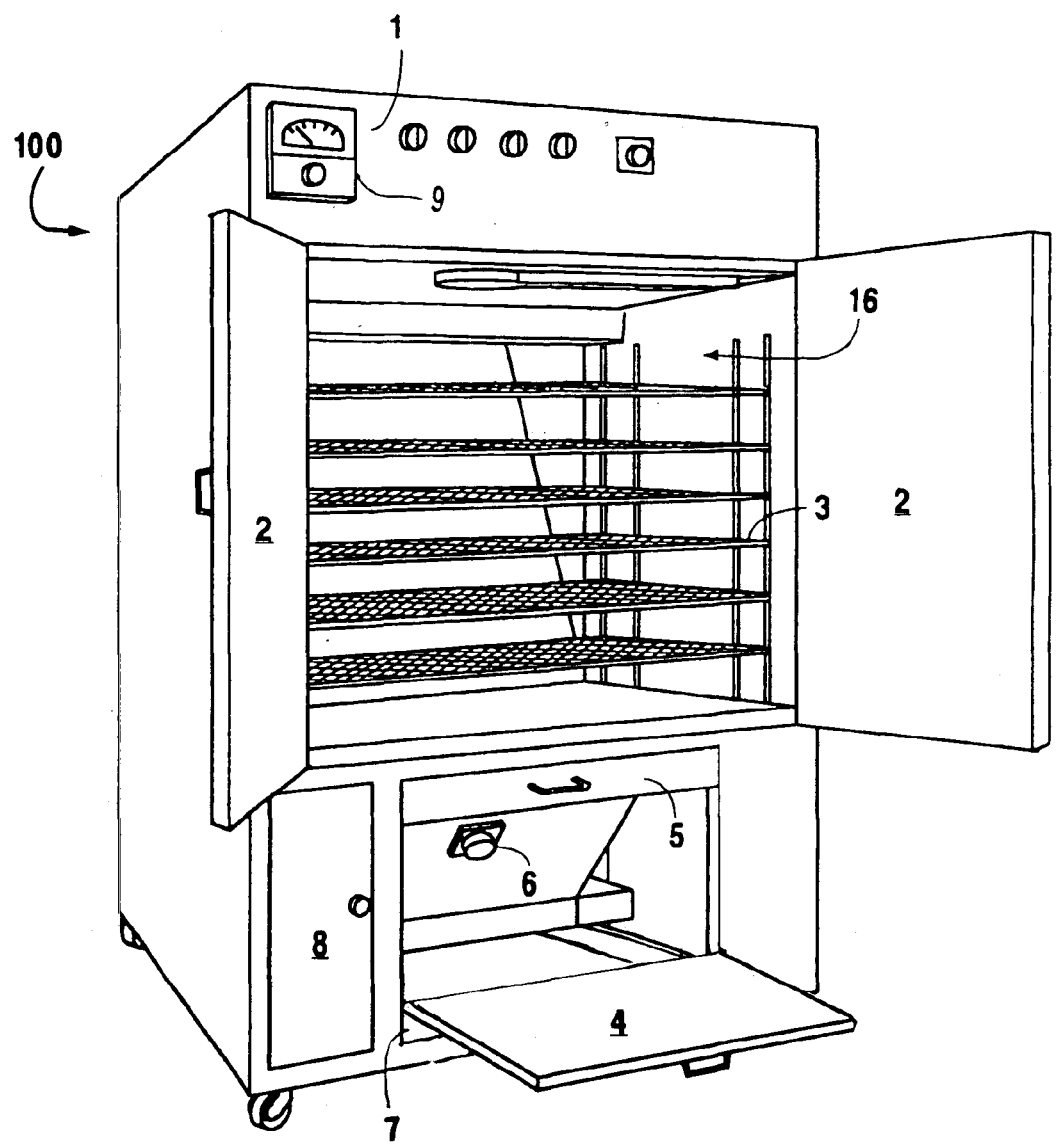
FIG. 1. is a perspective view of the present invention.

Referring to the figures, FIG. 1. illustrates one embodiment of Applicants' combination cooker and smoker 100 for cooking foodstuffs that uses novel devices and methods of generating, distributing, recirculating, and exhausting smoke. It shows the control panel 1, the cooking enclosure 16 with the cooking enclosure doors 2 open. The cooking enclosure 16 provides a compartment for placing foodstuffs during the cooking or smoking process. The cooker and smoker 100 control panel 1 provides a user (not shown) with the ability to monitor and control the cooker 100 by controlling one or more of the ambient temperature of the cooking enclosure 16, the ambient temperature of the combustion chamber 11, the temperature of the foodstuffs (not shown), the heat source 15 power, the vibrator 6 power, the fan 12 speed, the duration of the cooking or smoking process, the position of the first damper 17, the position of the second damper 18, the timer (not shown), the thermostat (not shown), and servo motors (not shown) that cause the various moving parts of the cooker/smoker 100 to move. A controller 9 on the control panel 1 provides the user (not shown) with the mechanism to set these characteristics. With the cooking enclosure doors 2 open, the food racks 3 are exposed. The open access door 4 provides a view of the floor of the combustion chamber 11, and the vibrator 6. Fuel units are supplied through fuel door 5. Storage door 8 provides access to a grease drain valve (not shown). At or near the bottom of the combustion chamber 11 is an ash bin 7 for easing the collection and removal of ashes generated.

Figure 2:
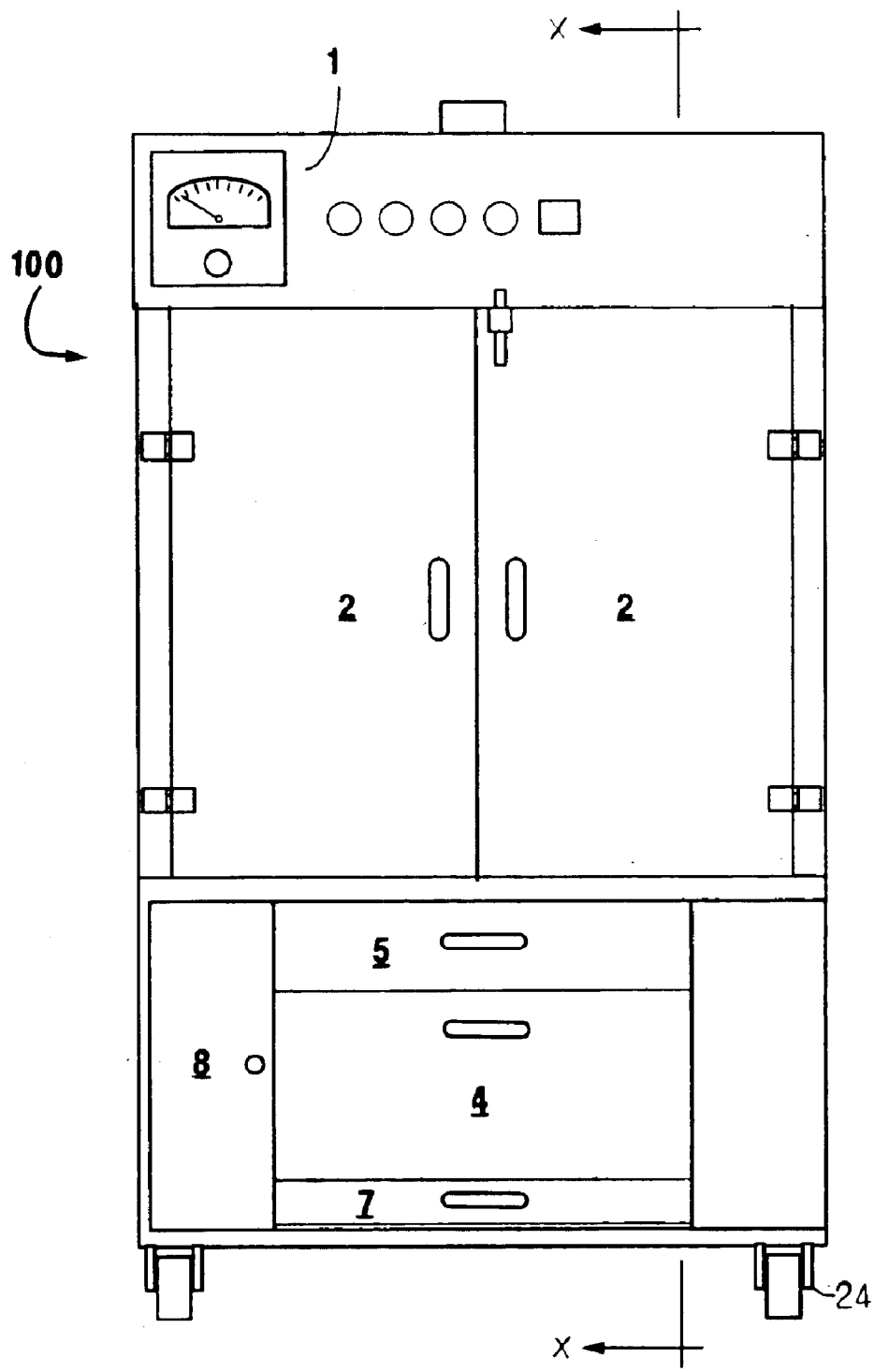
FIG. 2. is a front view of the present invention.

FIG. 2 is a front view of Applicant's cooker and smoker 100 with the cooking enclosure doors 2, the fuel drawer 5, and the storage door 8 all closed. The smoker 100 may be placed on rollers 24 in order to ease movement, or it can be placed directly on a floor.

Figure 3:
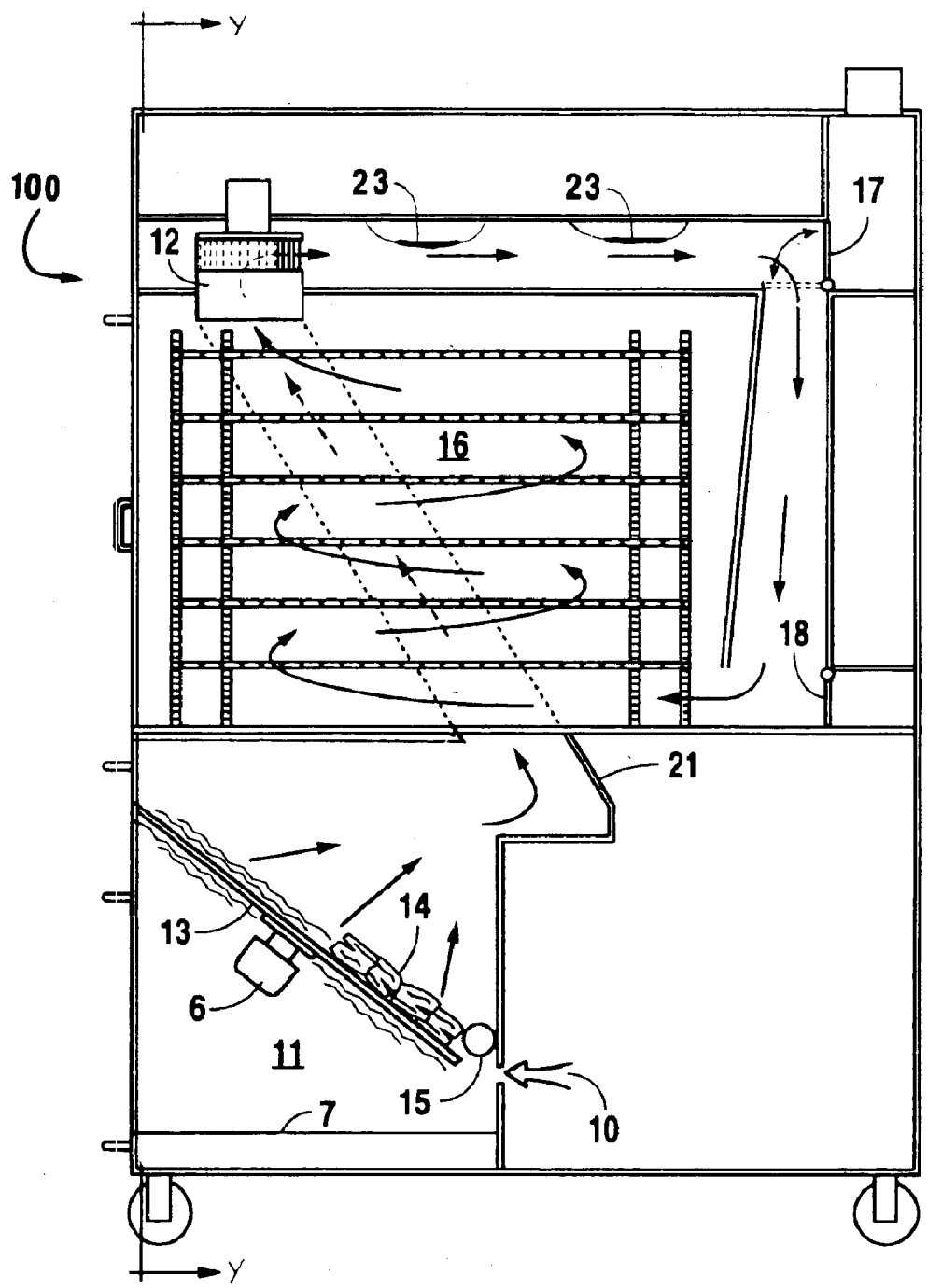
FIG. 3. is a full sectional side view of the present invention along plane X—X with the ducts sets for smoking foodstuffs.

FIG. 3 is a sectional side view complete with arrows indicating airflow paths during the cooking and smoking operation. First damper 17 is shown as it is positioned in a first position when smoke is being recirculated in the cooking enclosure 16. First damper 17 is shown as it is positioned in a second position, to evacuate smoke, in dashed lines. Second damper 18 is shown in a first position, closed to block the influx of outside air 19. FIG. 3 shows inlet air 10 being induced into combustion chamber 11 by fan 12, passing over fuel units 14, such as wood pieces or charcoal, that have been loaded onto a fuel unit holder 13. The fuel unit holder 13 is anticipated to be any of a rack, shelf, tray, pan, basket, or the like. The vibrating action of the fuel unit holder 13 feeds the fuel units 14 into heat source 15. The heat source 15 can be powered by electricity, gas, liquid fuel, or any means of generating energy. Vibration is provided by a vibrator 6, whose vibration may be powered by a source such as electric, magnetic, or liquid fuel. The vibrating may be by hydraulic solenoid action, asymmetrical shaft rotation, or any other means capable of imparting a periodic or random reciprocating motion. The vibration, acting in concert with gravity, assures that some surface area of the fuel unit 14 is in operative association with the heat source 15. Vibration also tends to continuously cause the charred surfaces (not shown) of the fuel unit 14 to break apart and fall into ash bin 7, exposing unpyrolized portions of the fuel unit 14 into operative association with the heat source 15. Thus, the heat source 15 is in operative association with the vibrator 6.

Combustion of the fuel unit 14 by the heat source 15 creates smoke that is induced into first duct 21 by fan 12. The fan 12 and first duct 21 direct the smoke to the cooking enclosure 16 where it impinges the foodstuffs (not shown), imparting heat, flavor, and aroma as it is recirculated into the fan 12. The fan 12 may be any suitable air moving device. First damper 17 is generally a double-acting damper so that it can preferably provide efficiency and compact design by providing a desired airflow path in either of its extreme positions. Second damper 18 acts as a closure device and is generally a single-acting damper. Proper positioning of the dampers 17 and 18 assures recirculation of the hot air and smoke. As positioned in FIG. 3., the dampers 17 and 18 direct the smoke into a recirculation path through cooking enclosure 16. Recirculation of the smoke is maintained until cooking is terminated and the smoke is vented from the cooker 100. If using the controller 9, a timer may signal when an operator-selected thermostatically-controlled cooking enclosure temperature is reached for a selected amount of time. Heat source 15 and vibrator 6 are generally turned off when cooking and smoking are complete. Heating element 23 may also be incorporated into the circulation path of the hot air and smoke. The heating element 23 may be used to maintain a desired temperature or re-heating the air and smoke as it circulates.

Figure 4:
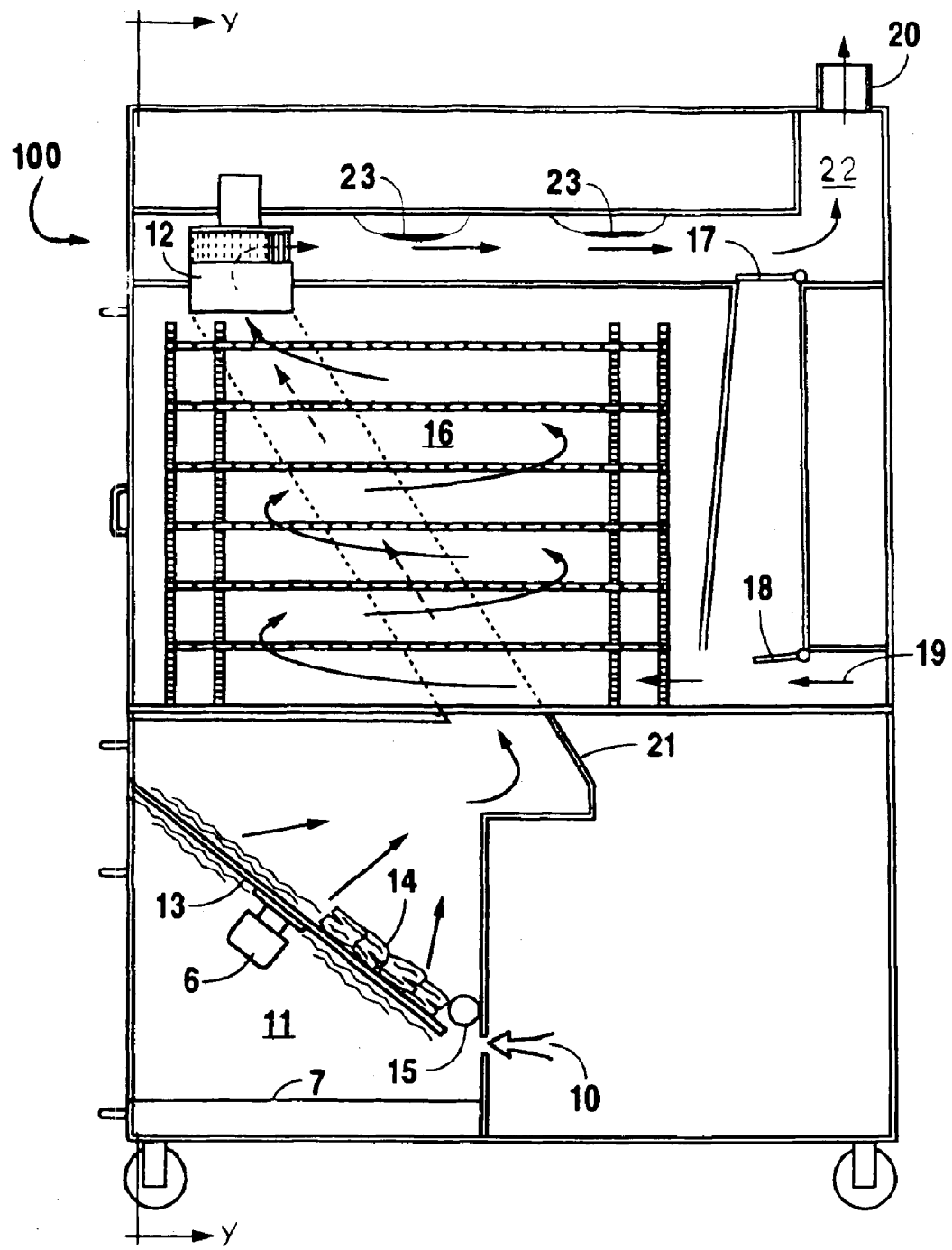
FIG. 4. is a full sectional side view of the present invention along plane X—X with the ducts sets for venting smoke from the cooking enclosure.

FIG. 4 is a sectional side view complete with arrows indicating airflow direction. When dampers 17 and 18 are positioned as shown in FIG. 4, the airflow assumes a cleansing configuration. First damper 17 is shown in a second position to evacuate smoke and hot air from the cooking enclosure 16. The second damper 18 is shown in a second position to admit fresh air 19. The residual smoke in the cooking enclosure 16 and first duct 21 is induced into fan 12, along with inlet air 10 and fresh air 19, all of which is vented through the second duct 22 and exhaust 20. In this manner, a relatively short amount of time is necessary to cleanse the cooking enclosure 16 of smoke and hot air.

Figure 5:
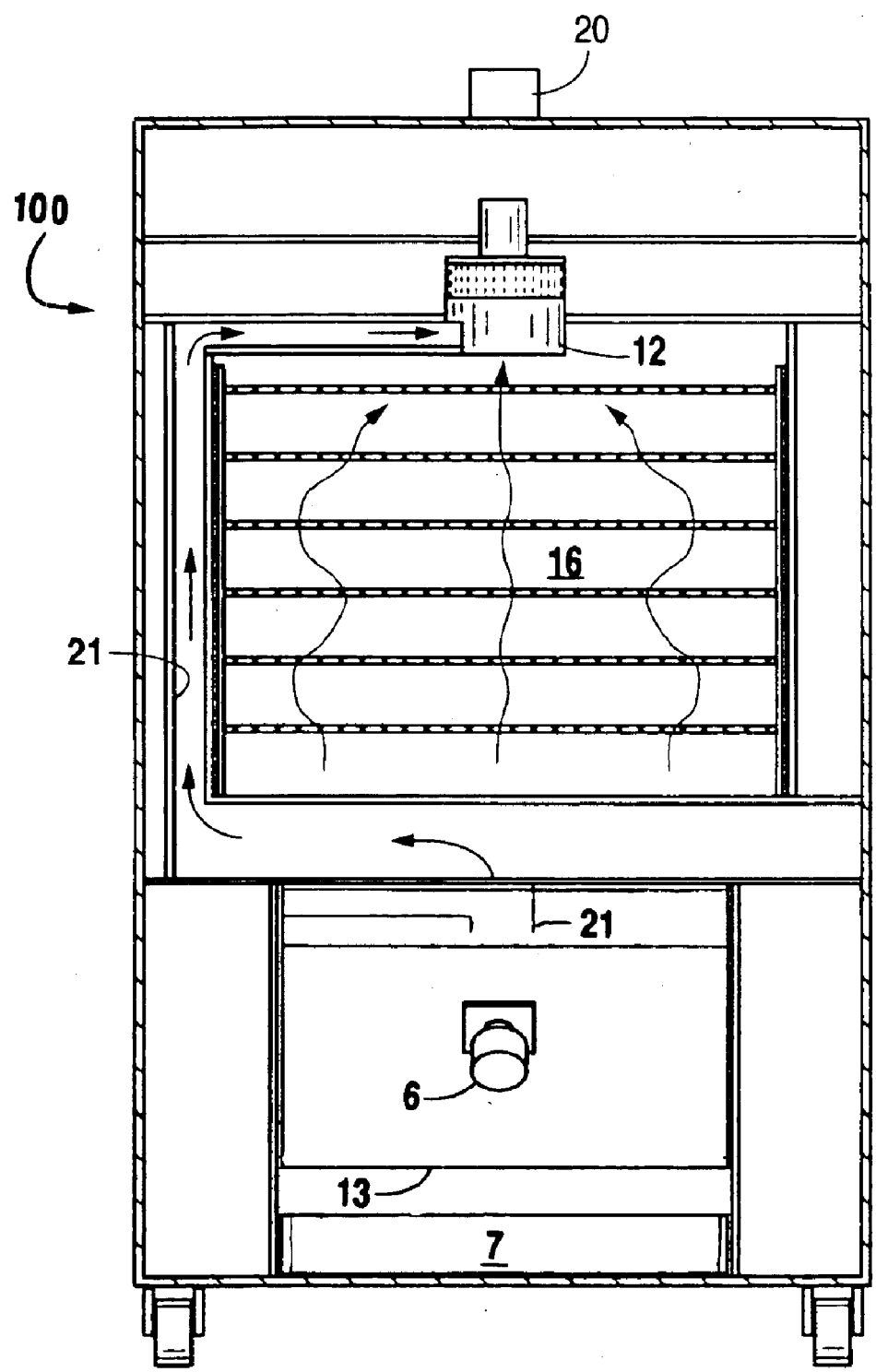
FIG. 5. is a full sectional front view of the present invention along plane Y—Y.

FIG. 5 is a sectional front view indicating airflow passing through first duct 21, from the combustion chamber 11, to fan 12, to the cooking enclosure 16. It further shows the relationship of the fuel unit holder 13, the vibrator 6, and the ash bin 7.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A smoker for smoking foodstuffs comprising:
    a cooking enclosure;
    a vibrator capable of moving a fuel unit in a reciprocating motion;
    a heat source in operative association with said vibrator; and
    wherein smoke generated from said fuel unit by said heat source is deposited in said cooking enclosure.

2. The smoker of claim 1 further comprising:
    a combustion chamber that houses said vibrator and said heat source, said combustion chamber in communication with said cooking enclosure via a first duct.

3. The smoker of claim 2 further comprising:
    a fan, wherein said fan is in operative association with said first duct, said fan capable of drawing said smoke from said combustion chamber and inducing said smoke into said cooking enclosure.

4. The smoker of claim 3 further comprising:
    a second duct in communication between said cooking enclosure and the outside of said smoker;
    a first damper, wherein said first damper is in operative association with said first duct and said second duct, said first damper capable of moving between a first position wherein smoke in said first duct is directed into said cooking enclosure, and a second position wherein smoke in said first duct is directed into said second duct and out of said smoker.

5. The smoker of claim 4, further comprising:
    a second damper, wherein said second damper is in operative association with said first duct, said second damper capable of moving between a first position wherein said cooking enclosure is isolated from fresh air, and a second position wherein fresh air is allowed into said cooking enclosure.

6. The smoker of claim 5, further comprising:
    a controller capable of monitoring and controlling at least one parameter of said smoker, selected from the group consisting of: ambient temperature of said cooking enclosure, ambient temperature of said combustion chamber, temperature of said foodstuffs, beat source power, vibrator power, fan speed, duration of the cooking or smoking process, position of said first damper, position of said second damper, timer, thermostat, and servo motors.

7. The smoker of claim 5, further comprising:

a heating element in said first duct.

8. A method of cooking foodstuffs in a cooking enclosure comprising:

loading a fuel unit onto a fuel unit holder;

vibrating said fuel unit holder in a reciprocating motion repetitively;

heating said fuel unit, with said heat being of sufficient intensity and duration to create smoke; and applying said smoke to said foodstuffs in said cooking enclosure.

9. The method of claim 8, wherein applying said smoke to said foodstuffs further comprises:

moving smoke through a duct using a fan; and positioning a first damper in said duct to direct said smoke into said cooking enclosure.

10. The method of claim 9, wherein applying said smoke to said foodstuffs further comprises:

positioning said first damper in said duct to direct said smoke out of said cooking enclosure; and positioning a second damper to allow fresh air into said cooking enclosure.

* * * * *